(12) United States Patent
Zhang et al.

(10) Patent No.: US 9,602,991 B1
(45) Date of Patent: Mar. 21, 2017

(54) USER NOTIFICATION OF CELLULAR SERVICE IMPAIRMENT

(71) Applicant: T-Mobile USA, Inc., Bellevue, WA (US)

(72) Inventors: Hongliang Zhang, Samammish, WA (US); Ahmad O. Alkabra, Newcastle, WA (US); Cristian Asandului, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/987,305

(22) Filed: Jan. 4, 2016

(51) Int. Cl.
*H04M 3/493* (2006.01)
*H04W 4/20* (2009.01)

(52) U.S. Cl.
CPC .................................. *H04W 4/20* (2013.01)

(58) Field of Classification Search
CPC ....... H04W 4/02; H04W 28/16; H04W 28/22; H04W 28/26; H04L 29/06027; H04L 47/70; H04L 12/5695; H04M 3/493
USPC ........ 455/414.2, 456.1, 414.3; 370/352, 355, 370/468
See application file for complete search history.

(56) References Cited

U.S. PATENT DOCUMENTS

| | | | | |
|---|---|---|---|---|
| 2010/0150120 | A1* | 6/2010 | Schlicht | H04W 4/20 370/338 |
| 2013/0298170 | A1* | 11/2013 | ElArabawy | H04W 28/0231 725/62 |

* cited by examiner

*Primary Examiner* — Temica M Beamer
(74) *Attorney, Agent, or Firm* — Lee & Hayes, PLLC (57) ABSTRACT

When a user of a mobile device attempts to use an application having high data demands, the mobile device queries its cellular data provider to determine currently available data transfer rates, based on the geographic location of the mobile device and the demands on the cellular base station from which the mobile device is being served. If the base station is experiencing data congestion, which is likely to result in a less than optimum user experience, the mobile device displays a warning to the user suggesting that the user postpone usage of the application or try using the application in a different geographic location that is experiencing less congestion.

16 Claims, 5 Drawing Sheets

USER NOTIFICATION OF CELLULAR
SERVICE IMPAIRMENT

BACKGROUND

The use of mobile devices such as cellular telephones and other devices with cellular data connectivity is proliferating. Almost everyone has some sort of mobile, data-enabled device, and some people have multiple such devices. Users can access different networks using a single mobile device, and can access voice, text, and multimedia data from various network-accessible and Internet-accessible entities. Furthermore, mobile device complexity is increasing, with more and more advanced and power-efficient processors, display interfaces, and applications to provide user experiences like never before. Consequently, people are using their mobile devices more frequently, and have larger bandwidth requirements for data, email, voice, etc.

This increased usage puts a tremendous strain on cellular networks that provide wireless communication services. In certain situations, cellular networks may become congested and may not be able to provide desired transfer speeds to requesting devices. For example, a user may attempt to play a video on their smartphone while in a network cell that is being highly utilized by many devices, and the network cell may have insufficient capacity to supply the data needs of all the demanding devices. In situations like these, video playback at the user device may be slow or interrupted, or may be presented at a relatively low resolution. This may lead to user dissatisfaction with the cellular network.

In another situation, a data allowance provided by a cellular network provider for a user device may have been exceeded and as a result the data speeds provided for the device may be throttled or reduced. This may lead to the same user frustration, in that video playback is slow or interrupted for a reason that is not apparent to the user.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods that present information to a user of a mobile communication device regarding network congestion and/or monthly data usage limiting, particularly in situations where the user is initiating an activity that is likely to exceed the current available capacity of the cellular network from which the mobile device is receiving data services. In described embodiments, the mobile device monitors applications that are launched on or that are executing on the mobile device. In particular, the mobile device detects when high-data-rate applications such as video streaming applications are launched and then queries the cellular network to determine the current level of availability or congestion at the particular geographic location of the mobile device.

In another embodiment, while applications are executing, the mobile device detects when high-data-rate applications experience performance degradation such as frequent stalling or lower data throughput than the minimum expected level. In particular, the mobile device detects when high-data-rate applications such as video streaming applications are experiencing performance degradation and then queries the cellular network to determine the current level of availability or congestion at the particular geographic location of the mobile device. The mobile device may also, or alternatively, query the cellular network to determine if the network is limiting data speeds because the user has exceeded his or her monthly data allowance.

When querying the cellular network, the mobile device provides the ID of the network cell or cellular base station from which the mobile device is currently receiving service. In response to receiving such a query, the cellular network determines the current data usage of the identified cell or base station and provides an indication of data availability to the mobile device. For example, the cellular network may indicate that the network is currently unable to satisfy the demand of high-data-rate activities such as video streaming. As another example, the cellular network may indicate a measure of current network congestion or a data rate that the cellular network is currently able to provide. As yet another example, the cellular network may indicate that data to and/or from the mobile device is being throttled or otherwise limited in speed due to the user exceeding his or her monthly data allowance.

In response to receiving an indication that the cellular network is likely unable to supply the data demands of a launched or executing application, the mobile device displays a warning to the user, indicating that performance of the application is likely to be impaired by limited available data rates. The user may be asked to postpone high-demand activities such as video streaming and may in some cases be offered rewards for postponing such activities.

In response to receiving an indication that the cellular network is throttling a user's data connection, the mobile device displays a message to the user, indicating that his or her data connection is being throttled. The user may be offered an upsell link/button to upgrade his or her monthly data plan to a higher level.

Figure 1:
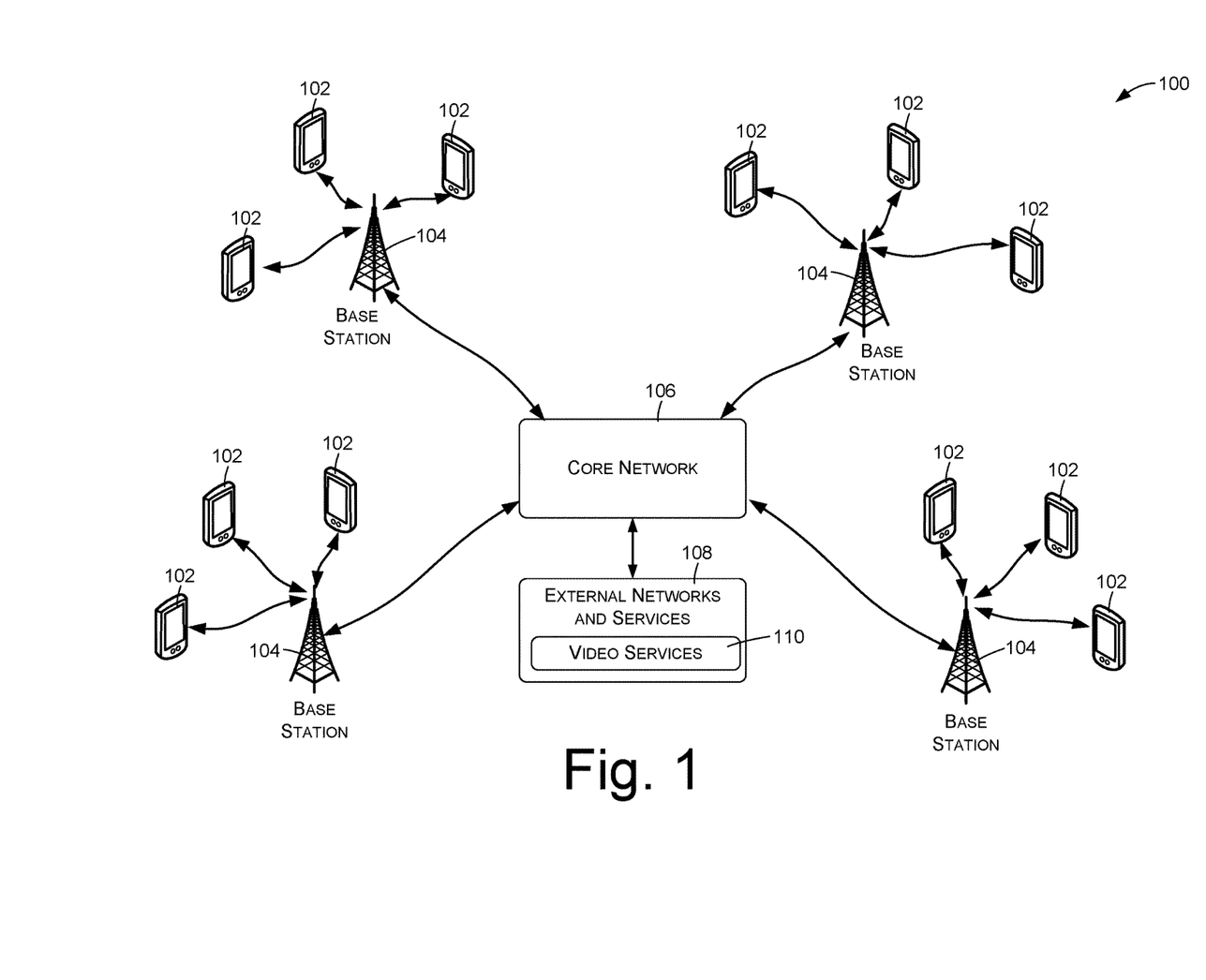
FIG. 1 is a block diagram illustrating an example system in which multiple mobile communication devices receive data services from a cellular communication network.

FIG. 1 illustrates a mobile communication system 100 in which the described techniques may be implemented. The system 100 may be implemented at least in part by a wireless cellular communication infrastructure, such as a communication infrastructure implemented in accordance with the System Architecture Evolution (SAE) communication standard and provided by a cellular communication services provider. In certain implementations, the system 100 may be implemented at least in part as a long-term evolution (LTE) cellular network.

The mobile communication system 100 may comprise multiple mobile communication devices 102, which are also referred to as mobile devices, mobile communication terminals, or user equipment (UE). Each mobile device 102 may comprise a telecommunication device such as a wireless telephone handset or smartphone, which is supported by the services of one or more cellular service providers. In certain embodiments, each mobile device 102 may comprise a smartphone, a tablet computer, a laptop computer, a wearable device, a media player, or any other type of device that is configured to use wireless data services of a cellular service provider or other data provider.

A cellular service provider may provide multiple base stations 104 with which the mobile devices 102 communicate. In the LTE environment, each base station may comprise an eNodeB. Each base station 104 is associated with a tower and antenna to facilitate wireless communications between the base station 104 and any mobile devices 102 that are within the wireless range of the base station 104. The geographic area served by a particular base station 104 is referred to as a cell of the cellular network. A mobile device 102 typically communicates with the nearest base station 104 or the base station 104 that has the highest signal strength at the location of the mobile device 102, although other criteria may also be used in determining which of multiple overlapping base stations 104 should be used by a particular mobile device 102 for communications.

As the mobile device 102 moves geographically, it may switch from one base station 104 to another. Thus, the mobile device 102 may communicate with different base stations 104 at different times, depending on the current geographic location of the mobile device.

Although four base stations 104 are shown in FIG. 1, a cellular network may include many thousands of base stations that are spread over a nation-wide or world-wide area. Furthermore, although three mobile devices 102 are shown as communicating with each base station 104, a much larger number of mobile devices may be using the cellular network through any particular base station 104 at any particular time.

The system 100 comprises a core network 106, referred to as an evolved packet core (EPC) in the LTE environment. The core network 106 includes gateways, routers, administrative components, and so forth. The base stations 104 communicate with the core network 106 using various types of communication channels and/or networks.

The core network 106 also provides communication with external networks and services 108, including various types of services that are accessible through a public communication network such as the Internet. The external services 108 may include websites, data sources, commerce sites, and so forth. With particular relevance to the discussion herein, the services 108 may include streaming video services 110 that may be accessed by the mobile devices 102 to obtain video content. In some cases, the video services 110 may be available through a website that is accessed by way of an Internet browser of a mobile device 102. In other cases, the video services 110 may be accessed by special-purpose applications running on the mobile devices 102.

Figure 2:
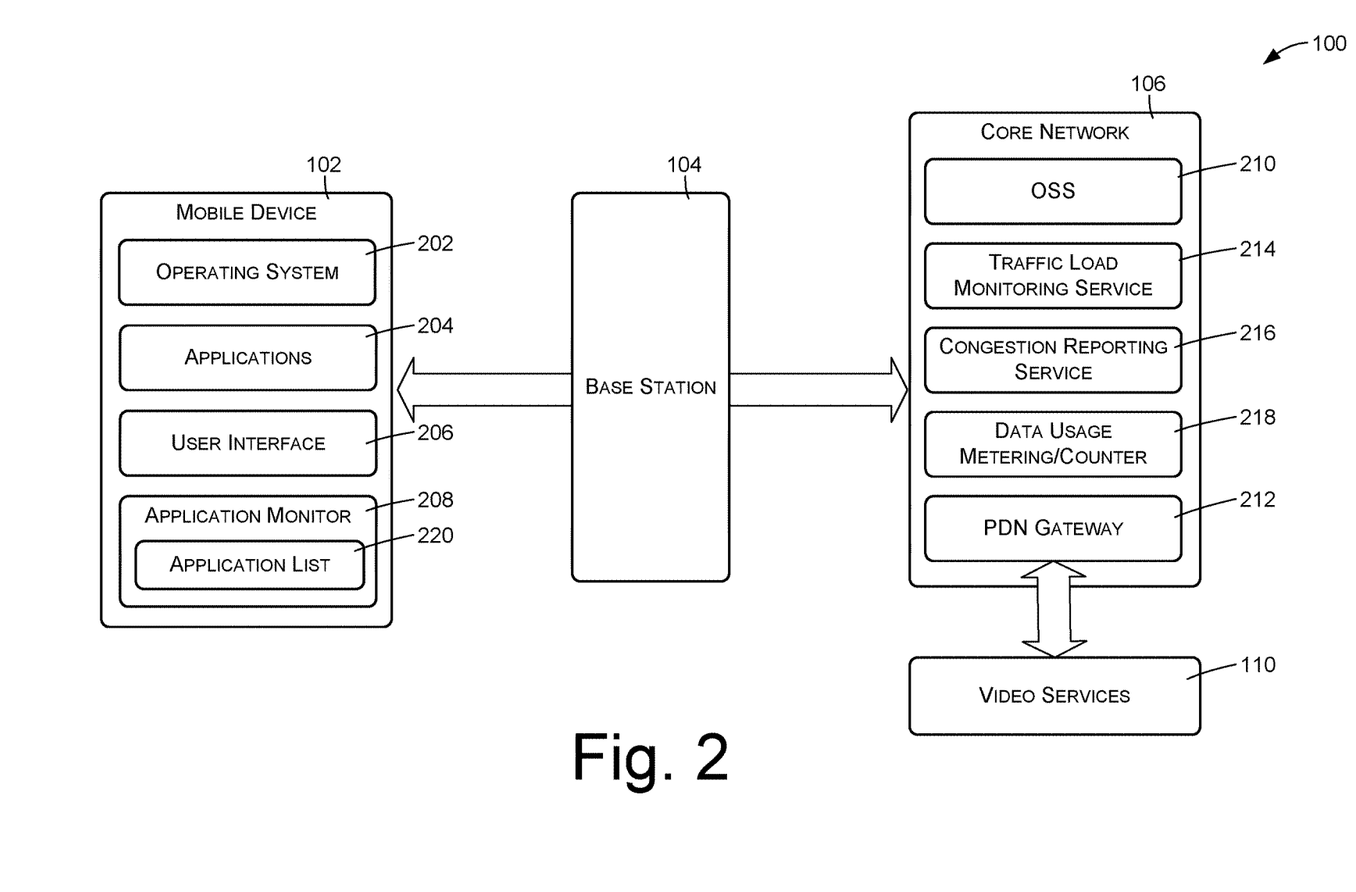
FIG. 2 is a block diagram illustrating further details of a cellular communication system that includes functionality for warning a user of a mobile communication device in situations where performance of an activity may be impaired because of congestion at the cellular communication network.

FIG. 2 illustrates further details regarding communications and example high-level components of a mobile device 102, a base station 104, and the core network 106. The mobile device 102 comprises an operating system 202 that manages software and hardware of the mobile device 102 and that provides services for one or more applications 204 that are installed on the mobile device 102. The applications 204 may be applications that are pre-installed on the mobile device 102 by the manufacturer or reseller of the mobile device 102, and/or may comprise applications that are installed by an owner or user of the mobile device 102 after purchase of the mobile device 102. The applications 204 may include media player applications, including applications that retrieve media from network-accessible services such as the video services 110. For example, the applications 204 may include a video streaming application that streams video from the video services 110. "Streaming" video is video that is presented to the viewer as it is being retrieved from a server or other external source such as a network source.

The mobile device 102 may comprise a user interface 206, which may as an example comprise a graphics display panel. In some cases, the user interface 206 may comprise a touch-sensitive display panel. The user interface 206 may include other elements such as buttons, indicators, speakers, microphones, and so forth.

The mobile device 102 may include an application monitor 208 that runs as a background service to detect when certain pre-identified applications are being launched and/or are being executed. The pre-identified applications are those applications that have been identified as typically needing relatively high data transfer rates for optimum operation. For example, video streaming and viewing applications may be among the pre-identified applications. Other media applications may also be among the pre-identified applications, such as applications that download large files like photographs. The application monitor 208 may also detect if an application is experiencing performance degradation or lower data throughput than a minimum expected level while an application is executing. Further functionality of the application monitor 208 will be described in more detail below.

The mobile device 102 communicates with the core network 106 through the base station 104. The core network 106 includes an operational support system (OSS) 210 that performs management functions of the core network 106. The core network 106 also includes a packet data network (PDN) gateway 212 that connects the core network 106 and ultimately the mobile device 102 with the external services 108. In particular, as shown in FIG. 2, the PDN gateway 212 connects the core network 106 and the mobile device 102 with the video services 110.

The core network 106 also comprises a traffic load monitoring service 214 that monitors data traffic, demands, and/or congestion at the base stations 104 of the system 100. For example, the traffic load monitoring service 214 may interact with the OSS 210, which may include a radio-access network (RAN) OSS to determine, for an individual base station 104, the number of mobile devices connected to the base station 104, the number of concurrent mobile devices that are receiving and transmitting data using the base station 104, the number of radio resource blocks that are available or currently unallocated at the base station 104, the number of currently available or unallocated frame slots at the base station 104, etc.

The core network 106 also comprises a congestion reporting service 216. An individual mobile device 102 may query the congestion reporting service 216 to determine a current service level that is available to the mobile device 102 from the base station 104 that is currently providing data services to the mobile device 102. The current service level may comprise a metric indicating the available speed of data transmission to and/or from the mobile device 102. In some cases, the current service level may be indicated as a binary value indicating whether or not the base station 104 is currently able to provide a desired or threshold level of data transmission rates. In other cases, the current service level may be indicated as a higher level of resolution, such as a metric ranging from 1 to 10, corresponding to the quality or rate of data transmissions that is likely to be available from the base station 104 in light of current demands for data from the base station 104.

The core network 106 may also comprise a data usage metering/counter 218 The data usage metering/counter 218 keeps track of monthly data consumption by individual devices or users. When a user exceeds his or her monthly data allocation, the network may throttle data to the user or otherwise limit the speed of data transfer with the mobile device 102. For example, the network may throttle a data connection to a low data rate, such as 128 kbps, if a user has reached his or her monthly data allowance based on the user's service plan.

Figure 3:
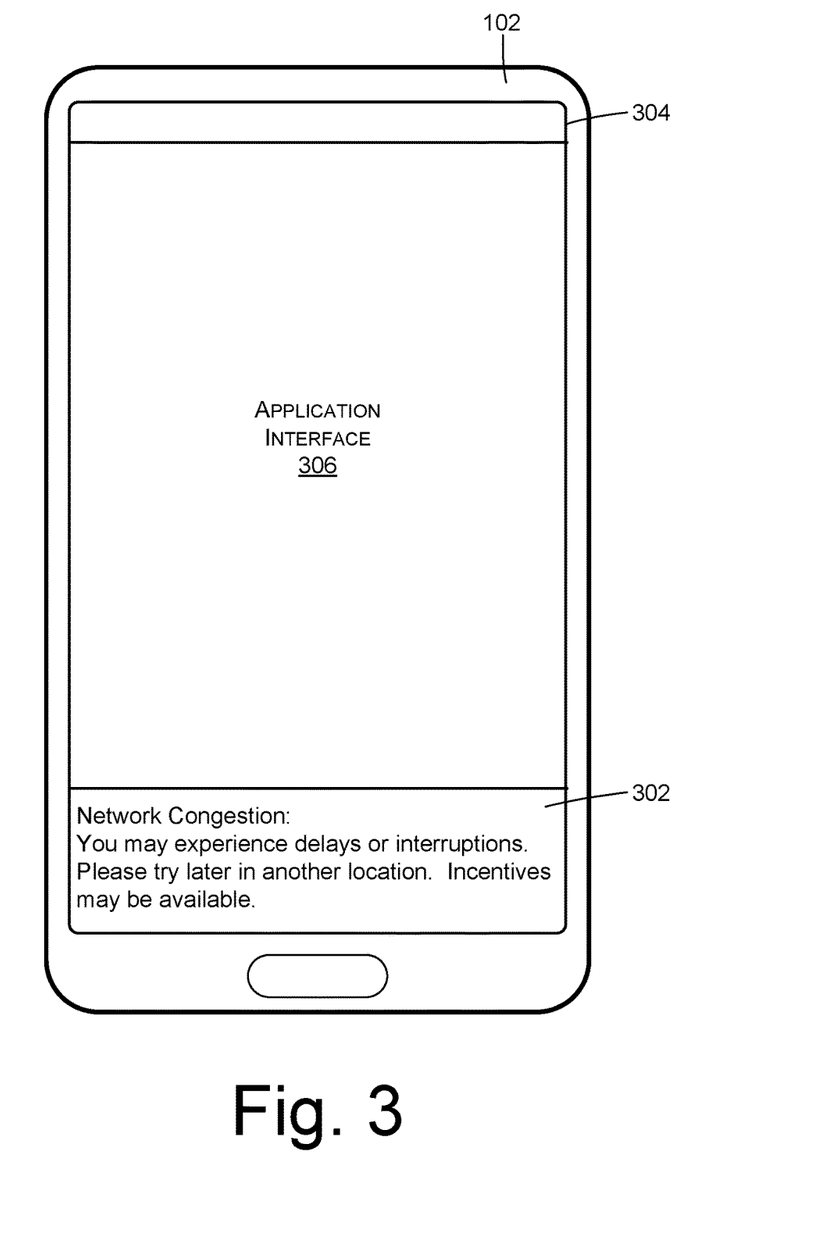
FIG. 3 illustrates a mobile communication device on which a warning is displayed indicating that performance of an activity may be impaired because of congestion at the cellular communication network.

FIG. 3 shows an example of a warning or notification 302 that may be displayed in situations where the base station 104 may be unable to provide sufficient data transfer rates to support an application that a user is attempting to run on the mobile device 102. FIG. 3 illustrates the mobile device 102 in the form of a smartphone having a graphical display 304 such as an LCD touch screen. The device 102 is illustrated as presenting an application interface 306 on the graphical display 304, wherein the application interface 306 may be generated by an application executing on the device 102.

The notification 302 may comprise a modal dialog that can be dismissed by the user to resume normal operations. The notification 302 may overlay the application interface 306. The notification 302 may comprise a pop-up display, a banner display, or any other form of visual, audible, and/or tactile notification. In this example, the notification is a visual textual display with the heading "Network Congestion". The notification 302 explains that the user may experience delays or interruptions, and requests that the user postpone usage of the application and/or try again in another geographic location. The notification 302 may include a message indicating to the user that incentives or rewards may be available for postponing usage of the application. In situations where insufficient data speeds are the result of data throttling, the notification 302 may present a message indicating to the user that the connection is being throttled and that the user can upgrade his or her service plan to a higher level. An upsell link or button may be provided in this case.

The notification 302 may be presented upon launching an application, such as a streaming video application, that relies on relatively high data communication rates for optimal operation. The notification 302 may be presented during execution of the application and/or when the application attempts to transfer data.

Returning to FIG. 2, the application monitor 208 may maintain an application list 220 indicating or identifying applications that are known to depend on high data transfer rates. In response to one of the listed applications being launched, the application monitor 208 may communicate with the congestion reporting service 216 to determine whether the cellular network is able to provide the high data transfer rates through the base station 104 from which the mobile device 102 is receiving service. In some embodiments, the communication by mobile device 102 with the congestion reporting service may indicate the cell ID or other identifier associated with of the base station 104 from which the mobile device 102 is receiving service. In other embodiments, the mobile device 102 may indicate its geographic location in terms of geographic coordinates.

In response to receiving a query from the application monitor 208, the congestion reporting service 216 interacts with the traffic load monitoring service 214 to determine the current load and/or availability of the base station 104 identified by the query. The congestion reporting service 216 then returns an indicator to the mobile device 102 indicating the current service level that is available to the mobile device 102 from the base station 104. Based on this information, the application monitor 106 determines whether to display the notification 302. The notification 302 is displayed when there is a likelihood that the base station 104 will be unable to reliably provide the level of data transfer rates that are needed by the launched application for optimal performance and user experience.

In response to receiving a query from the application monitor 208, the congestion reporting service 216 may interact with the data usage metering/counter 218 to determine the user's data usage status. The congestion reporting service 216 may then return an indicator to the mobile device 102 indicating if his or her connection is being throttled. Based on this information, the application monitor 106 determines whether to display the notification 302. The notification 302 is displayed when the connection is being throttled.

Figure 4:
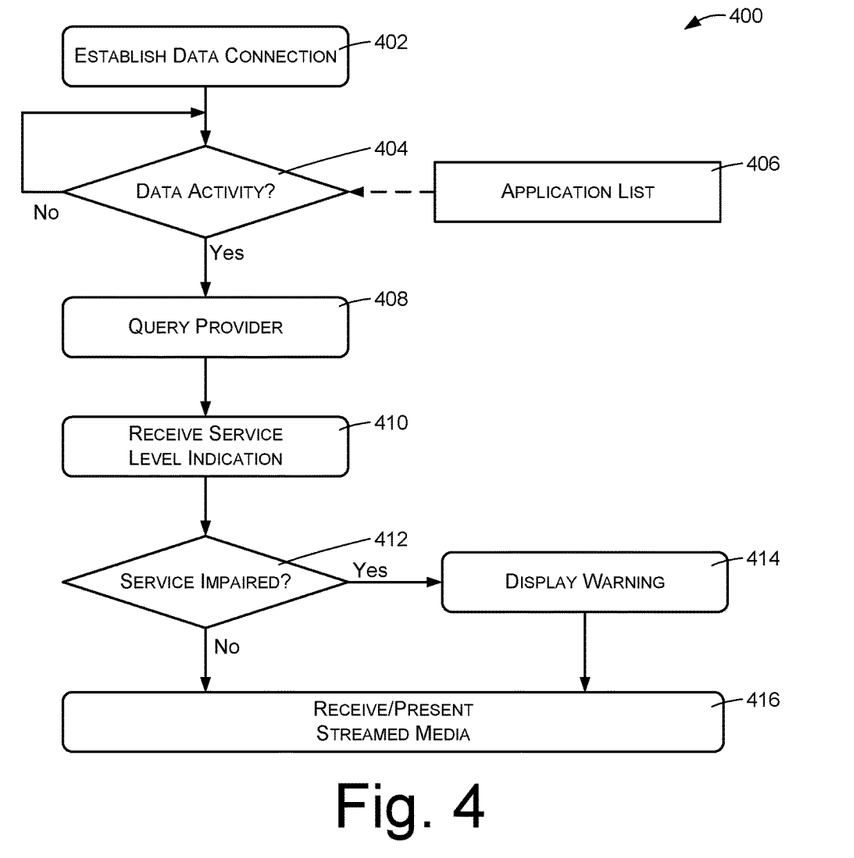
FIG. 4 is a flow diagram illustrating an example method that may be performed by a mobile communication device to warn a user that an activity may be impaired because of congestion at the cellular communication network.

FIG. 4 illustrates an example method 400 for warning a user of a mobile communication device of inadequate data service levels in response to the user initiating an activity that relies upon relatively high data transfer rates. The actions of FIG. 4 may be performed by the mobile device 102 described above.

The method 400 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other methods described throughout this disclosure, in addition to method 400, shall be interpreted accordingly.

An action 402 comprises establishing a data connection between the wireless communication device and a wireless data provider. As described above, the data connection may be through a cellular data communication network, such as through a base station and an associated core network of a cellular network infrastructure. The mobile communication device may communicate through a base station that is associated with a communication cell of the wireless data provider. The communication cell may correspond to a geographic area serviced by the base station. The base station may provide data services for multiple mobile communication devices within the geographic area or cell served by the base station.

An action 404 comprises detecting an activity that depends on at least a threshold rate of data transfer by the wireless data provider. For example, the action 404 may comprise detecting operation of an application that transfers data through the data connection with the wireless data provider. As a more specific example, the action 404 may comprise detecting initiation or execution of an application such as a video streaming application that streams video from an external, network-accessible server or source. Such an application relies on the availability of relatively high data transfer rates in order to produce an acceptable quality of experience for a user of the mobile communication device.

The action 404 may reference a preconfigured and/or configurable application list 406 that indicates applications that are known to depend on relatively high data transfer rates. The action 404 may comprise detecting the initiation and/or execution of any of the applications indicated by the application list 406.

If a data-reliant activity is not detected, the action 404 is repeated in a loop to continue to monitor executing or initiated applications. If a data-reliant activity is detected in the action 404, an action 408 is performed of querying the wireless data provider regarding a data transfer rate that is currently available to the wireless communication device from the wireless communication provider, in the geographic area of the wireless communication device. The query provided to the wireless communication provider may indicate the geographic area in which the mobile communication device is currently located. For example, the query may indicate the cell ID of the system cell within which the mobile communication device is located. The cell ID may correspond to or may identify a base station from which the mobile communication device is receiving data services. In some embodiments, the query may indicate geographical coordinates corresponding to the location of the wireless communication device.

In some embodiments, the action 404 may comprise monitoring executing applications to detect when an application is experiencing performance degradation or lower data throughput than the minimum expected level.

If performance degradation is detected in the action 404, the action 408 may comprise querying the wireless data provider regarding a data transfer rate that is currently available to the wireless communication device from the wireless communication provider. The query provided to the wireless communication provider may indicate the geographic area in which the mobile communication device is currently located. For example, the query may indicate the cell ID of the system cell within which the mobile communication device is located. The cell ID may correspond to or may identify a base station from which the mobile communication device is receiving data services. In some embodiments, the query may indicate geographical coordinates corresponding to the location of the wireless communication device.

An action 410 comprises receiving a service level indication from the wireless data provider regarding the data transfer rate that is currently available to the wireless communication device from the wireless data provider. The available data transfer rate may be dependent at least in part on demand for data by multiple wireless communication devices in the geographic area of the mobile communication device. The indication may be based, for example, on a measure of data congestion being experienced by the base station that is serving the mobile communication device or may indicate a current available data transfer rate. In some cases, the indication may indicate simply whether the base station is able to provide unimpaired data transfer rates. In other cases, the indication may indicate a level of impairment of data transfer rates relative to nominal or unimpaired rates that are normally provided by the wireless data provider. In yet other cases, the indication may indicate that data to or from the mobile device is being throttled or may indicate a current throttled connection data rate, such as 128 kbps, that is a result of the user exceeding his or her monthly data allocation.

An action 412 comprises determining, based at least in part on the service level indication received from the wireless data provider, whether performance of the application is likely to be degraded because of temporarily low data transfer rates available from the wireless data provider. The action 412 may in some cases comprise comparing the service level indication to a threshold. In some cases, for example, the application list 406 may indicate an appropriate rate threshold for each of multiple applications, and the action 412 may comprise comparing the threshold associated with the detected application with a data transfer rate indicated by the service level indication.

If the service level indication indicates that data transfer rates to/from the mobile communication device are likely to be impaired, an action 414 is performed of displaying a notice or warning, such as the notification 302 shown in FIG. 3. The notification may warn a user of the mobile communication device to expect degraded performance of the application, such as degraded video streaming. In some cases, the notification may suggest that the user postpone using the application until a later time, when network congestion has been relieved. In some cases, the notification may suggest that the user try using the application in a different geographic location where congestion may be less.

The notification may also inform the user of incentives or other rewards that may be available for postponing usage of the application. Such rewards may comprise points, for example, that may be accumulated for tangible rewards such as products or services. As a specific example, an offered reward may comprise free data allocations for usage by the mobile device during times of non-congestion.

In the situation in which the notification informs the user of data throttling, the notification may provide an upsell link for the user to immediately upgrade to a data plan with a higher data allowance.

The method 400 may comprise an action 416 of streaming or receiving streamed media data such as video and presenting or displaying the received media. In some embodiments, the action 416 may be initiated and performed after performing the actions 412 and 414 of determining whether data rates are impaired and, if appropriate, displaying a warning to the user. For example, in the case where the action 414 is performed, the action 416 may be initiated only after the user acknowledges or dismisses the warning. In other embodiments, the action 416 may be initiated at any point in the method 400, such as after the action 402 of establishing the data connection 402 and before the detecting action 404.

The method 400 may be performed by the application monitor 208 in conjunction with the operating system 202. For example, the application monitor 208 may be configured to receive information from the operating system 202 regarding applications that are executing, that are being initiated, and/or that are being activated by a user of the mobile device 102. In response, the application monitor 208 may determine whether a newly launched application is an application that uses or relies on high data transfer rates and may display the warning 302 in situations in which performance of the application is likely to be degraded by impaired data transfer rates. In other embodiments, an application itself may perform the method 400. That is, the action 404 may comprise detecting a point in the application at which high data rates will be used, and in response performing the remaining actions of FIG. 4.

Figure 5:
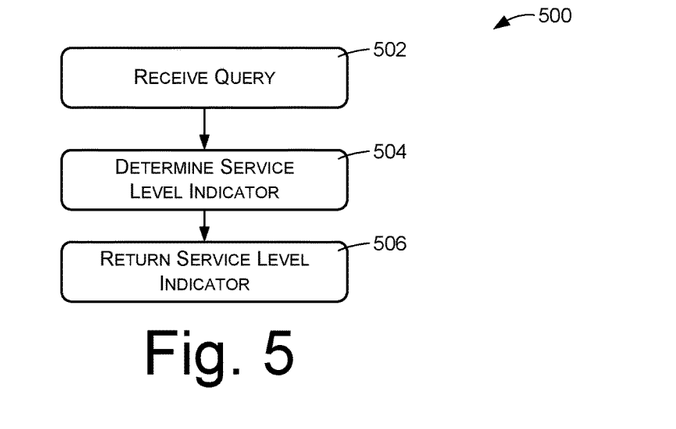
FIG. 5 is a flow diagram illustrating an example method of reporting a service level indicator to a requesting mobile communication device.

FIG. 5 illustrates an example method 500 that may be performed by components of the core network 106 in response to receiving a query from the mobile communication device regarding the currently available data transfer rate at the geographic location or cell of the mobile communication device. In the context of FIG. 2, the example method 500 may be performed by the congestion reporting service 215 in conjunction with the traffic load monitoring service 214.

An action 502 comprises receiving a query from a mobile communication device regarding a currently available data transfer rate. The query may specify the cell ID corresponding to the base station through which the mobile communication device is receiving data services, or may otherwise indicate a geographic location of the mobile communication device.

An action 504, performed in response to receiving the query, comprises determining a service level indicator corresponding to an anticipated or estimated rate of data transfer that may be available to the querying mobile communication device, based on the location of the mobile communication device and/or the cell ID provided by the mobile communication device. The action 504 may comprise querying management components of the core network to determine the current load of the base station that is currently providing services to the mobile communication device. The load may be quantified based on the number of supported mobile devices, the number of concurrent mobile devices are receiving and transmitting data using the base station 104, the number of open frame slots, the number of available radio resource blocks, etc.

The action 504 may comprise querying the data usage metering/counter 218 of the core network regarding data allocation status so that a notification of throttling can be displayed if appropriate.

An action 506 comprises returning the service level indicator to the querying mobile communication device. As discussed above, the service level indicator may comprise a binary indicator indicating either congestion or non-congestion. In other embodiments, the service level indicator may indicate estimated data transfer rates or index to a look-up table stored in mobile devices.

Figure 6:
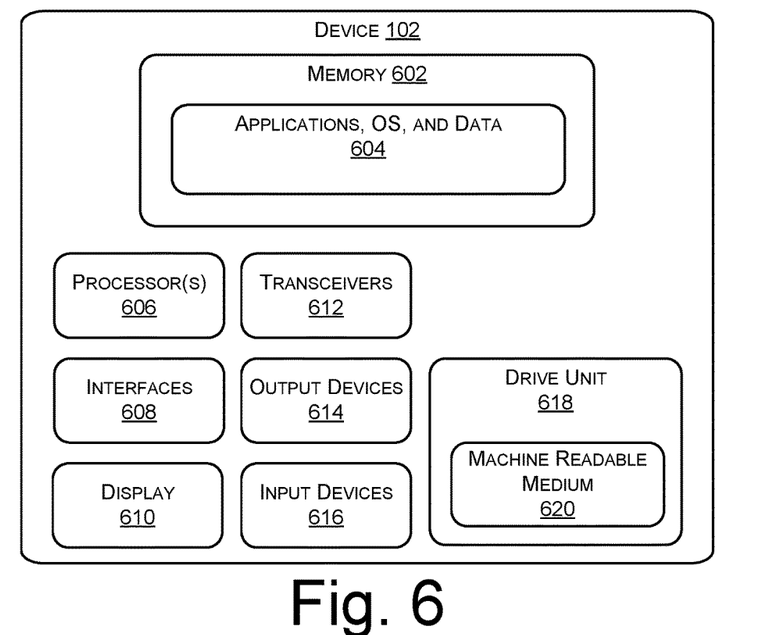
FIG. 6 is a block diagram illustrating example components of a mobile communication device.

FIG. 6 illustrates an example device 102 in accordance with various embodiments. As shown, the device 102 may include a memory 602, which may store applications, an operating system (OS), and data 604. The device 102 further includes processor(s) 606, interfaces 608, a display 610, radio transceivers 612, output devices 614, input devices 616, and a drive unit 618 including a machine readable medium 620.

In various embodiments, the memory 602 includes both volatile memory and non-volatile memory (e.g., RAM, ROM, EEPROM, flash memory, miniature hard drive, memory card, CD-ROM, digital versatile disks (DVD) or other optical storage, magnetic cassettes, magnetic tape, magnetic disk storage or other magnetic storage devices, or any other computer storage device or medium). Additionally, in some embodiments, the memory 602 includes a SIM (subscriber identity module) card, which is a removable memory card used to identify a user of the device 102 to a service provider network.

The memory 602 can also be described as non-transitory computer storage media and may include volatile and non-volatile, removable and non-removable media implemented in any method or technology for storage of information, such as computer readable instructions, data structures, program modules, or other data. The applications, OS, and data 604 are stored in the memory 602. The applications, OS, and data 604 may include the application monitor 208 shown in FIG. 2.

In some embodiments, the processor(s) 606 is a central processing unit (CPU), a graphics processing unit (GPU), or both CPU and GPU, or other processing unit or component known in the art.

In various embodiments, the interfaces 608 are any sort of interfaces known in the art. The interfaces 608 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 610 may comprise a liquid crystal display or any other type of display commonly used in telecommunication devices or other portable devices. For example, display 610 may be a touch-sensitive display screen, which may also act as an input device or keypad, such as for providing a soft-key keyboard, navigation buttons, or the like.

In some embodiments, the transceivers 612 include any sort of transceivers known in the art. For example, the transceivers 612 may include radios and/or radio transceivers and interfaces that perform the function of transmitting and receiving radio frequency communications via an antenna, through a cellular communication network of a wireless data provider. The radio interfaces facilitate wireless connectivity between the device 102 and various cell towers, base stations and/or access points.

In some embodiments, the output devices 614 include any sort of output devices known in the art, such as a display (already described as display 610), speakers, a vibrating mechanism, or a tactile feedback mechanism. The output devices 614 also include ports for one or more peripheral devices, such as headphones, peripheral speakers, or a peripheral display.

In various embodiments, the input devices 616 include any sort of input devices known in the art. For example, the input devices 616 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, stylus, or the like.

The machine readable medium 620 stores one or more sets of instructions (e.g., software) such as a computer-executable program that embodies operating logic for implementing and/or performing any one or more of the methodologies or functions described herein. The instructions may also reside, completely or at least partially, within the memory 602 and within the processor 606 during execution thereof by the device 102. The memory 602 and the processor 606 also may constitute machine readable media 620.

Figure 7:
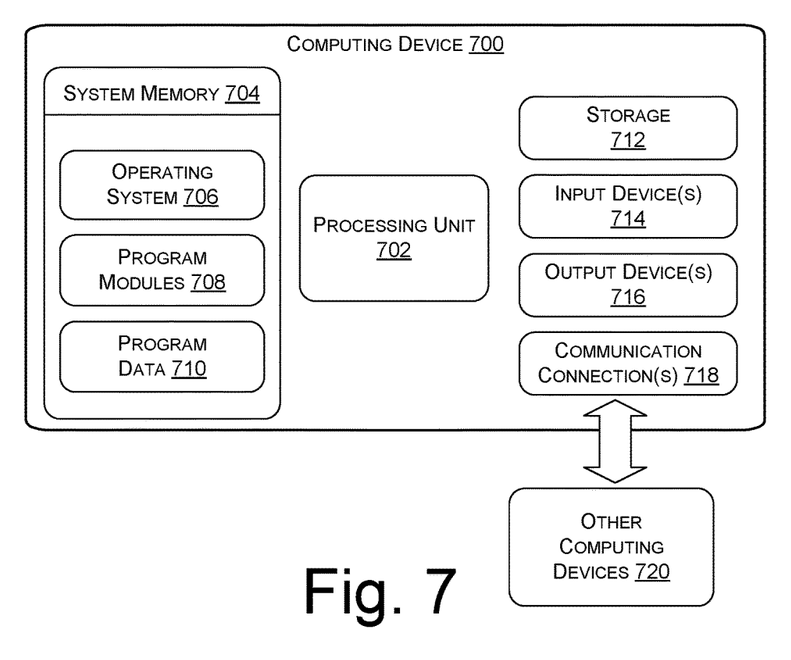
FIG. 7 is a block diagram illustrating example components of a computing device that may be used to implement various functions of a cellular communication system.

FIG. 7 is a block diagram of an illustrative computing device 700 such as may be used to implement various components of the core network 106 including routers, gateways, administrative components, etc., including the traffic load monitoring service 214 and the congestion reporting service 216. In various embodiments, the computing device 700 may include at least one processing unit 702 and system memory 704. Depending on the exact configuration and type of computing device, the system memory 704 may be volatile (such as RAM), non-volatile (such as ROM, flash memory, etc.) or some combination of the two. The system memory 704 may include an operating system 706, one or more program modules 708, and may include program data 710. The program mobiles may include modules for implementing the traffic load monitoring service 214 and/or the congestion reporting service 216.

The computing device 700 may also include additional data storage devices (removable and/or non-removable) such as, for example, magnetic disks, optical disks, or tape. Such additional storage is illustrated in FIG. 7 by storage 712.

Non-transitory computer storage media may include volatile and nonvolatile, removable and non-removable media implemented in any method or technology for storage of information, such as computer readable instructions, data structures, program modules, or other data. The system memory 704 and storage 712 are examples of non-transitory computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such non-transitory computer-readable storage media may be part of the device 700.

In various embodiment, any or all of the system memory 704 and storage 712 may store programming instructions which, when executed, implement some or all of the function functionality described above as being implemented by a cellular services provider and/or components provided by a cellular services provider.

The computing device 700 may also have input device(s) 714 such as a keyboard, a mouse, a touch-sensitive display, voice input device, etc. Output device(s) 716 such as a display, speakers, a printer, etc. may also be included. The computing device 700 may also contain communication connections 718 that allow the device to communicate with other computing devices 720.

Although features and/or methodological acts are described above, it is to be understood that the appended claims are not necessarily limited to those features or acts. Rather, the features and acts described above are disclosed as example forms of implementing the claims.

What is claimed is:

1. A method comprising:
   establishing, by a wireless communication device, a data connection between the wireless communication device and a wireless data provider, the wireless communication device being in a geographic area that is served by the wireless data provider;
   streaming, by an application of the wireless communication device, video through the data connection and displaying the video to a user of the wireless communication device;
   querying, by the application of the wireless communication device, the wireless data provider regarding a data transfer rate that is currently available from the wireless data provider in the geographic area of the wireless communication device;
   receiving, by the application of the wireless communication device, an indication from the wireless data provider regarding the data transfer rate that is currently available from the wireless data provider in the geographic area, the data transfer rate being dependent at least in part on demand for data by multiple wireless communication devices in the geographic area;
   based at least on the data transfer rate, displaying, by the application of the wireless communication device, a notification to expect degraded video streaming; and
   displaying, by the application of the wireless communication device, a message in conjunction with the notification, the message offering to reward the user for postponing the streaming and/or encouraging the user to stream the video at a different location.

2. The method of claim 1, wherein the indication from the wireless data provider comprises a binary indicator that indicates whether the wireless data provider is experiencing data congestion in the geographic area.

3. The method of claim 1, wherein querying the wireless data provider comprises specifying a cell ID of a cellular base station from which the wireless communication device is receiving data service, the indication being based at least in part on a measure of data congestion being experienced by the cellular base station.

4. The method of claim 1, wherein an executing application receives the video, the method further comprising detecting initiation of the application, wherein the querying is performed in response to detecting the initiation of the application.

5. One or more non-transitory computer storage media with a stored computer-executable program, which, when executed by one or more processors of a telecommunication device, performs actions comprising:
   establishing a data connection between the telecommunication device and a wireless data provider;
   detecting operation of an application of the telecommunication device that transfers data through the data connection;
   querying, by the application of the telecommunication device, the wireless data provider regarding a data transfer rate that is currently available to the wireless communication device from the wireless data provider;
   receiving, by the application of the telecommunication device, an indication from the wireless data provider regarding a data transfer rate that is currently available to the wireless communication device from the wireless data provider; and
   based at least in part on the indication, displaying, by the application of the telecommunication device, a notification to expect degraded performance of the application and offering to reward the user for postponing operation of the application and/or encouraging the user to utilize the application at a different location.

6. The one or more non-transitory computer-readable storage media of claim 5, the actions further comprising maintaining a list of applications that depend on relatively high data transfer rates, the list including the application.

7. The one or more non-transitory computer-readable storage media of claim 5, wherein the application is configured to stream video from a network source.

8. The one or more non-transitory computer-readable storage media of claim 5, wherein the indication from the wireless data provider comprises a binary indicator that indicates whether the wireless data provider is experiencing data congestion.

9. The one or more non-transitory computer-readable storage media of claim 5, wherein querying the wireless data provider comprises specifying a cell ID of a cellular base station from which the telecommunication device is receiving data service, the indication being based at least in part on a measure of data congestion being experienced by the cellular base station.

10. The one or more non-transitory computer-readable storage media of claim 5, wherein detecting operation of the application comprises detecting initiation of the application.

11. The one or more non-transitory computer-readable storage media of claim 5, the actions further comprising displaying a message in conjunction with the notification, the message offering to upgrade the user to a data plan with a higher data allowance.

12. A wireless communication device, comprising:
   a cellular radio configured to receive data through a cellular communication network of a wireless data provider;
   operating logic configured to perform actions comprising:
      detecting an activity that depends on a threshold rate of data transfer by the wireless data provider;
      querying the wireless data provider regarding a data transfer rate that is currently available to the wireless communication device from the wireless data provider;
      receiving an indication from the wireless data provider regarding the data transfer rate that is currently available to the wireless communication device from the wireless data provider; and
      based at least in part on the indication, displaying a notification to expect degraded performance of the activity; and
      displaying a message in conjunction with the notification, the message offering to reward a user for postponing the activity and/or encouraging the user to perform the activity at a different location.

13. The wireless communication device of claim 12, wherein querying the wireless data provider is performed in response to detecting performance degradation of the activity.

14. The wireless communication device of claim 12, wherein the activity comprises running a video streaming application on the wireless communication device.

15. The wireless communication device of claim 12, the actions further comprising maintaining a list of applications that depend on relatively high data transfer rates, wherein detecting the activity comprises detecting operation of one of the applications.

16. The wireless communication device of claim 12, wherein querying the wireless data provider comprises specifying a cell ID of a cellular base station from which the wireless communication device is receiving data service, the indication being based at least in part on a measure of data congestion being experienced by the cellular base station.

* * * * *